US012589992B2

(12) United States Patent
Monguillon

(10) Patent No.: US 12,589,992 B2

(45) Date of Patent: Mar. 31, 2026

(54) HYDROGEN STORAGE BY MEANS OF LIQUID ORGANIC COMPOUNDS

(71) Applicant: ARKEMA FRANCE, Colombes (FR)

(72) Inventor: Bernard Monguillon, Colombes (FR)

(73) Assignee: Arkema France, Colombes (FR)

( * ) Notice: Subject to any disclaimer, the term of this patent is extended or adjusted under 35 U.S.C. 154(b) by 325 days.

(21) Appl. No.: 17/998,813

(22) PCT Filed: Oct. 7, 2021

(86) PCT No.: PCT/FR2021/051738

§ 371 (c)(1),
(2) Date: Nov. 15, 2022

(87) PCT Pub. No.: WO2022/074336

PCT Pub. Date: Apr. 14, 2022

(65) Prior Publication Data

US 2024/0166501 A1 May 23, 2024

(30) Foreign Application Priority Data

Oct. 8, 2020 (FR) ...................................... 2010289

(51) Int. Cl.
*C01B 3/00* (2006.01)
*C01B 3/0015* (2026.01)

(52) U.S. Cl.
CPC ...... *C01B 3/0015* (2013.01); *C01B 2203/063* (2013.01)

(58) Field of Classification Search
CPC ............ C01B 3/0015; C01B 2203/063; C01B 2203/1252; C01B 3/24; Y02E 60/32
See application file for complete search history.

(56) References Cited

U.S. PATENT DOCUMENTS

| | | | | |
|---|---|---|---|---|
| 4,197,417 | A | 4/1980 | Morley | |
| 2008/0241615 | A1* | 10/2008 | Sugimasa | B60L 50/72 123/3 |
| 2009/0025824 | A1 | 1/2009 | Noujima et al. | |
| 2014/0107036 | A1 | 4/2014 | Marinkovich et al. | |
| 2015/0266731 | A1* | 9/2015 | Boesmann | B01J 19/24 423/651 |
| 2016/0002544 | A1 | 1/2016 | Sorensen, Jr. et al. | |
| 2016/0326438 | A1* | 11/2016 | Sorensen | C10G 3/57 |

FOREIGN PATENT DOCUMENTS

| | | | |
|---|---|---|---|
| DE | 2840272 | A1 | 4/1979 |
| EP | 2925669 | A1 | 10/2015 |
| JP | 2004250256 | A | 9/2004 |
| WO | 2011031320 | A2 | 3/2011 |
| WO | 2014082801 | A1 | 6/2014 |

OTHER PUBLICATIONS

ISA/EP; International Search Report and Written Opinion for International Patent Application No. PCT/FR2021/051738 dated Feb. 1, 2022, 10 pages.
Aakko-Saksa, Paivi T., et al., "Liquid organic hydrogen carriers for transportation and storing or renewable energy—Review and discussion", Journal of Power Sources, vol. 396, Jul. 10, 2018, 22 pages.
Marques Da Silva, Maria Sol, et al., "Benzylation of benzene, toluene and anisole with benzyl alcohol catalyzed by cation-exchange resins", Reactive Polymers, ELSEVIER, vol. 25, Jan. 20, 1995. 7 pages.
Yurino, Taiga, et al., "Selective Conversion of Benzylic Phosphates into Diarylmethanes Through Al(OTf)3-Catalyzed Friedel-Crafts-Type Benzylation", European Journal of Organic Chemistry, Jan. 17, 2020, 8 pages.

* cited by examiner

*Primary Examiner* — Anthony J Zimmer
*Assistant Examiner* — Syed T Iqbal
(74) *Attorney, Agent, or Firm* — Rimon P.C.; Allyn B. Elliott

(57) ABSTRACT

The present invention relates to the use of a formulation which is liquid at ambient temperature comprising at least a mixture of benzene, toluene and xylene for the fixing and the release of hydrogen in at least one hydrogenation/dehydrogenation cycle of said formulation.
The invention also relates to the use of said formulation for the transportation and the handling of hydrogen resulting from the steam cracking of petroleum products, of inevitable hydrogen resulting from chemical reactions, such as the electrolysis of salt, or of hydrogen resulting from the electrolysis of water.

9 Claims, No Drawings

HYDROGEN STORAGE BY MEANS OF LIQUID ORGANIC COMPOUNDS

CROSS-REFERENCE TO RELATED APPLICATIONS

This application is a U.S. National Stage application of International Patent Application No. PCT/FR2021/051738, filed on Oct. 7, 2021, which claims the benefit of French Patent Application No. FR2010289, filed on Oct. 8, 2020.

The present invention relates to the field of the storage and transportation of an energy source and more particularly to that of the storage and transportation of hydrogen as an energy source, and in particular to that of organic compounds capable of storing and transporting hydrogen.

The storage and transportation of hydrogen by means of organic compounds is a recent technology which has for some years been the subject of publications in the scientific literature and of filings of patent applications. The principle consists in fixing hydrogen on a support molecule, which support molecule being preferably and most often liquid at ambient temperature, both when it has fixed the hydrogen (hydrogenated form) and when it has released the hydrogen (dehydrogenated form).

This fixation of hydrogen is generally carried out in a stage of hydrogenation of the support molecule. The support molecule, thus hydrogenated, "stores" the fixed hydrogen and this molecule, referred to as "hydrogenated", can be stored and/or transported. The fixed hydrogen can subsequently be released, most often close to the site of consumption, in a stage of dehydrogenation of the hydrogenated support molecule.

Support molecules are today the subject of numerous studies and are now better known under the acronym LOHC for "Liquid Organic Hydrogen Carrier".

Mention may be made, by way of support molecules studied today, of supports of metal hydride type, or also, among LOHCs, of methanol, ammonia or aromatic compounds. All these technologies exhibit various advantages and disadvantages, it being known that one of the most important criteria in this new type of technology remains the overall cost of access to energy, thus the overall cost of the hydrogen available by these support molecules.

Mention may be made, among the most studied LOHCs today, of toluene, which can be hydrogenated to give methylcyclohexane and then dehydrogenated. One of the problems encountered with this molecule is its relatively low boiling point (110.6° C. at atmospheric pressure, admittedly higher than that of the hydrogenated form, methylcyclohexane: 100.85° C.), which can result in the production of hydrogen containing traces of toluene and/or methylcyclohexane, which can be difficult to get rid of.

The traces of organic compounds in the hydrogen released during the dehydrogenation reaction can pose a real problem depending on the applications envisaged and the fields of application where the hydrogen is used. In the case of the toluene/methylcyclohexane pair, the traces of organic compounds can thus come both from toluene (molecule in hydrogenated form) and from methylcyclohexane (molecule in dehydrogenated form), but also from all their partially hydrogenated or dehydrogenated intermediates.

Other LOHCs known today are aromatic fluids having two or three rings, represented in particular by benzyltoluene (BT) and/or dibenzyltoluene (DBT) and which have already been the subject of numerous studies and patent applications, such as, for example, the patent EP 2 925 669, which describes the technology and the operations for hydrogenation and dehydrogenation of these fluids for the storage and the release of hydrogen. Still other LOHC compounds are under study and examples are presented in the paper by Päivi et al. (*Journal of Power Sources,* 396 (2018), 803-823). Such molecules are still today for the most part not readily available commercially or else at prohibitive prices.

Furthermore, and beyond the instantaneous performance quality of the hydrogenation and dehydrogenation stages, the quality of the hydrogen obtained during the dehydrogenation stage and above all the maintenance of the performance qualities (hydrogen fixing/release yield) are key points for the economic aspect of this technology. It is thus necessary to develop, for the transportation and storage in particular of large amounts of hydrogen, a solution which is economically profitable.

This is because the hydrogen resulting from this LOHC technology finds uses in a great many fields, such as, for example, in fuel cells, in industrial processes, or also as fuel for transportation means (trains, boats, trucks, motor cars). The LOHC technology today seems the most promising but there remains a need for LOHC molecules which are readily available, inexpensive, or at the very least with exhibiting very good yields in terms of hydrogenation/dehydrogenation cycles, with supply and operating costs which are as low as possible.

One of the objectives of the present invention consequently consists in developing LOHC molecules which make possible the transportation and storage of the greatest possible amount of hydrogen with the lowest possible operating cost, in other words the most profitable possible LOHC molecule for the transportation and storage of hydrogen.

It has now been discovered that the abovementioned objectives are achieved, in all or at least in part, by virtue of the present invention. Yet other objectives may become apparent in the description of the present invention which follows.

Specifically, the inventors have now discovered that mixtures of benzene, toluene and xylene can advantageously be used as LOHC. Thus, a first subject matter of the present invention is the use of a formulation which is liquid at ambient temperature comprising a mixture of benzene, toluene and xylene for the fixing and the release of hydrogen in at least one hydrogenation/dehydrogenation cycle of said formulation.

Mixtures of Benzene, Toluene and Xylene are well known under the acronym "BTX" and are readily accessible, for example in crude oil refineries, where they are often regarded as byproducts which are not or not significantly upgradable or upgraded. Their costs are thus entirely competitive and suitable for the use according to the present invention.

More particularly, BTX mixtures can be obtained from petroleum products and in particular by extraction of the aromatic compounds from a crude oil, in particular with the help of a polar aprotic solvent, using liquid-liquid extraction. The solvent is subsequently removed and the BTX mixture is separated by distillation in order to recover the benzene, toluene and xylene. The xylene fraction comprises the three isomers of xylene (ortho-, meta- and para-xylene) but can also comprise a more or less significant fraction of ethylbenzene.

Other possible sources of mixtures referred to as BTX mixtures are known today, among which may be mentioned the upgrading of biomass, as described, for example, in the applications WO2011031320, US2014107036 and US2016002544.

In a preferred embodiment, the BTX mixture used in the formulation of the present invention is devoid of compounds comprising more than 8 carbon atoms. In the present account, the term "devoid of compounds comprising more than 8 carbon atoms" indicates that compounds comprising more than 8 carbon atoms may possibly be present but in this case only in the form of traces, that is to say present in an amount which is not greater than 1000 ppm by weight, with respect to the total weight of the formulation, and preferably not greater than 100 ppm by weight, with respect to the total weight of the formulation.

The BTX mixtures (or more simply "the BTXs" in the continuation of the present account) are mixtures of benzene, toluene and xylene (ortho- and/or meta- and/or para-xylene), and optionally ethylbenzene, in all proportions. According to a preferred embodiment of the invention, the ratio of the benzene/toluene/xylene mixture can vary in all proportions ranging from 0% to 100%, limits excluded, by weight of each constituent, with respect to the total weight of the BTX mixture.

According to another embodiment, the BTX mixture consists at a minimum level of two products: toluene+benzene or toluene+xylene or xylene+benzene. Preferably, the BTX mixture comprises the three components benzene, toluene and xylene and very particularly preferably in the proportions indicated above.

According to a preferred aspect of the present invention, the BTX mixture comprises, and preferably consists of:

from 0% to 99% by weight of benzene, limits included,
- from 0% to 99% by weight of toluene, limits included, and
- from 0% to 99% by weight of xylene, limits included, with respect to the total weight of the composition, it being understood that at least two of the three components are present.

According to another aspect of the present invention, the BTX mixture comprises, and preferably consists of:

from 1% to 99% by weight of benzene, limits included,
- from 1% to 99% by weight of toluene, limits included, and
- from 0.01% to 99% by weight of xylene, limits included, with respect to the total weight of the composition.

According to yet another aspect of the present invention, the BTX mixture comprises, and preferably consists of:

from 2% to 99% by weight of benzene, limits included,
- from 2% to 99% by weight of toluene, limits included, and
- from 1% to 99% by weight of xylene, limits included, with respect to the total weight of the composition.

According to a very particularly preferred aspect, the mixture of benzene, toluene and xylene which can be used in the context of the present invention contains a benzene content of greater than 1%, better still of greater than 2%, preferably of greater than 5%, more preferably of greater than 10% and entirely preferably of greater than 15% by weight, with respect to the total weight of the BTX mixture.

By way of nonlimiting example, a BTX mixture which can advantageously be used in the context of the present invention contains 40% of benzene, 30% of toluene and 30% of xylene, by weight, with respect to the total weight of the BTX mixture. According to another example, the BTX mixture contains 48% of benzene, 33% of toluene and 19% of xylene, by weight, with respect to the total weight of the BTX mixture.

As indicated above, the BTX mixtures can additionally comprise one or more other compounds, for example isomers of xylenes, such as ethylbenzene, or also one or more other hydrocarbons containing more than 8 atoms, preferably in an amount which is not greater than 1000 ppm by weight, with respect to the total weight of the formulation, and preferably not greater than 100 ppm by weight, with respect to the total weight of the formulation.

The composition of the BTX mixture can result directly from the preparation process but can also be modified directly during the synthesis of said according to procedures well known to a person skilled in the art, depending on the mixture which he/she wishes to obtain.

It has been discovered, entirely surprisingly, that BTX mixtures can be used as liquid organic hydrogen carrier (LOHC) in the same way as each of the constituents of said mixtures, namely benzene, toluene and xylene, that is to say that the mixtures can be subjected to the hydrogenation/dehydrogenation cycles in the same way as the components of said BTX mixtures, taken in isolation and independently. It follows that it is pointless to carry out the separation of said components of the BTX mixtures, in order to use only one or the other of them, and thereby save on costs and make the use of the present invention entirely competitive and more generally more economical than the known LOHCs of the prior art.

For the requirements of the present invention, it is of course possible to use a single BTX mixture or also mixtures of several BTX mixtures as they have just been defined, in all proportions.

In an embodiment of the invention, it can be advantageous to carry out one or more purification operations on the BTX mixture, according to any method well known to a person skilled in the art, in particular to avoid contamination of the hydrogen which will be produced during the dehydrogenation of said BTX mixture, to avoid the passivation of the catalysts during the hydrogenation and dehydrogenation operations, to improve the yields of the hydrogenation and dehydrogenation reactions, to increase the lifetime (number of cycles of the hydrogenation and dehydrogenation reactions) of the BTX mixture or of the BTX mixtures used as LOHC.

The molecules referred to as LOHC molecules are generally and most often characterized by their Theoretical Gravimetric Storage Capacity (TGSC). The theoretical gravimetric storage capacity of a hydrogen absorption system (LOHC+/LOHC− pair) in which the hydrogen is stored in the mass of the material, is calculated from the ratio of the weight of hydrogen stored in the compound, with respect to the weight of the host including the hydrogen (LOHC+), so that the capacity in % by weight, TGSC, is given by the following formula:

$$TGSC = \frac{\text{(molar mass of releasable hydrogen)}}{\text{(molar mass of the host in its completely hydrogenated form)}} \times 100$$

For example, methylcyclohexane can be theoretically dehydrogenated to give toluene (one of the components of BTX) with the release of 6 hydrogen atoms, as illustrated below:

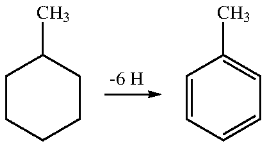

Thus, the theoretical gravimetric storage capacity TGSC of the methylcyclohexane/toluene system is equal to:

$$TGSC = \frac{6}{98} \times 100 = 6.12\%$$

Similarly, the TGSC of benzene, which is 7.69%, and the TGSC of xylene, which is 5.3%, are calculated.

In the above example, toluene, when it is completely hydrogenated to give methylcyclohexane and then theoretically completely dehydrogenated, can thus release 6 hydrogen atoms. It will thus be indicated in the context of the present invention that toluene exhibits a TGSC of 6.12%.

According to a preferred embodiment of the invention, the mixtures of benzene, toluene and xylene which can be used in the context of the present invention exhibit a TGSC strictly of greater than 0%, preferably of greater than or equal to 1%, better still of greater than or equal to 2%, more preferably of greater than or equal to 3%, entirely preferably of greater than or equal to 4%, advantageously of greater than or equal to 5%, typically of greater than or equal to 6% and better still of greater than or equal to 6.5%.

For example, a BTX mixture containing 48% of benzene (TGSC=7.69%), 33% of toluene (TGSC=6.12%) and 19% of xylene (TGSC=5.3%), by weight, with respect to the total weight of the BTX mixture, will thus exhibit an average TGSC of 6.72%. There is thus seen one of the great advantages in using the BTX mixtures according to the invention in that they most often exhibit a TGSC at least comparable to, indeed even greater than, that of toluene, which is today one of the LOHCs recommended for the storage and the transportation of hydrogen in the liquid state at ambient temperature.

The BTXs thus find, in this use for the storage and transportation of hydrogen in the liquid state at ambient temperature, an entirely unexpected and entirely profitable upgrading, in view of the cost/TGSC ratio of the BTX mixtures.

In some cases, and according to an embodiment of the present invention, it can be advantageous to modify, for example to further increase, the TGSC of the LOHCs. It is consequently possible to envisage subjecting the mixture of benzene, toluene and xylene to various chemical reactions with other molecules, for example molecules resulting from petrochemicals, in particular aromatic compounds resulting from petrochemicals, such as benzene, toluene, xylenes, polyethylbenzene residues better known under the name PEBR, and also their mixtures in all proportions, to mention only the commonest.

By way of example, it is thus possible to carry out couplings starting from halogenated, in particular chlorinated, or hydroxylated derivatives, according to procedures well known to a person skilled in the art and in particular those described in the patent DE2840272 A1, in the publication by Maria Sol Marques da Silva et al., *Reactive Polymers,* 25, (1995), 55-61, or also more recently in the paper by Taiga Yurino et al., *European Journal of Organic Chemistry*, (2020), 2020(15), 2225-2232.

In one embodiment of the present invention, it is preferred to use the mixtures of benzene, toluene and xylene (BTX mixtures) as such, without other chemical modification, in particular coupling, this being for obvious reasons of reduction in the costs of access to LOHCs. However, it can be useful, indeed even necessary in some cases, to carry out one or more purification operations on the BTX mixture, according to techniques well known to a person skilled in the art, in order in particular to optimize the yields of the hydrogenation/dehydrogenation cycles during the use of LOHC formulations containing said BTX mixtures.

The invention thus relates to the use of a formulation which is liquid at ambient temperature, in its partially or completely dehydrogenated form, as in its partially or completely hydrogenated form, comprising one or more BTX mixtures as they have just been defined for the transportation, the fixing and the release of hydrogen in at least one partial or complete hydrogenation/dehydrogenation cycle of said formulation.

The formulation which can be used in the context of the present invention can additionally comprise one or more other LOHCs known to a person skilled in the art, such as, for example, benzyltoluene (BT), dibenzyltoluene (DBT) and their mixtures in all proportions.

The formulation which can be used in the present invention can additionally comprise one or more additive(s) and/or filler(s) also well known to a person skilled in the art and, for example, and in a nonlimiting way, chosen from antioxidants, passivators, pour point depressants, decomposition inhibitors, colorants, aromas, and the like, and also the mixtures of one or more of them in all proportions.

According to another embodiment, and according to the requirements in particular in terms of purity of hydrogen to be released, the formulation comprises only (partially or completely) hydrogenatable/dehydrogenatable compounds; in particular, the formulation consists of LOHC molecules, without other added products of additive or filler types. The formulation may, however, contain impurities, preferably in trace form, in particular inherent in the origin of the LOHC molecule used and/or its process of preparation.

According to another preferred embodiment of the present invention, the formulation exhibits a boiling point of greater than 80° C. at atmospheric pressure, preferably of greater than 120° C., more preferably of greater than 150° C., advantageously of greater than 180° C., and a melting point of less than 40° C., preferably of less than 30° C., more preferably of less than 20° C., better still of less than 15° C., and entirely preferably a melting point of less than 10° C. and advantageously of strictly less than 0° C.

According to another embodiment, the formulation used in the present invention exhibits a kinematic viscosity at 20° C. (measured according to the standard DIN 51562) of between 0.1 $mm^2 \cdot s^{-1}$ and 500 $mm^2 \cdot s^{-1}$, preferably between 0.5 $mm^2 \cdot s^{-1}$ and 300 $mm^2 \cdot s^{-1}$ and preferably between 1 $mm^2\ s^{-1}$ and 200 $mm^2 \cdot s^{-1}$.

The hydrogenation/dehydrogenation cycles are generally carried out according to methods which are now well known. In particular, the dehydrogenation reaction can be carried out according to any known method, the operating conditions of which can comprise, by way of nonlimiting examples:

- reaction temperature generally of between 200° C. and 400° C., preferably between 250° C. and 360° C., more preferably between 280° C. and 340° C., more preferentially between 280° C. and 330° C. and completely preferably between 280° C. and 320° C., reaction pressure generally of between 0.01 MPa and 1.00 MPa and preferably between 0.01 MPa and 0.50 MPa, feeding the dehydrogenation reactor with a partial hydrogen pressure, halting the reaction before complete dehydrogenation of the compound(s) to be dehydrogenated.

The reaction is generally and advantageously carried out in the presence of at least one dehydrogenation catalyst well known to a person skilled in the art. Mention may be made, among the catalysts which can be used for said partial dehydrogenation reaction, by way of nonlimiting examples, of heterogeneous catalysts containing at least one metal on a support. Said metal is chosen from the metals of columns 3 to 12 of the Periodic Table of the Elements of the IUPAC, that is to say from the transition metals of said periodic table. In a preferred embodiment, the metal is chosen from the metals of columns 5 to 11, more preferentially of columns 5 to 10, of the Periodic Table of the Elements of the IUPAC.

The metals of these catalysts are generally chosen from iron, cobalt, copper, titanium, molybdenum, manganese, nickel, platinum, palladium, rhodium, iridium and ruthenium, and their mixtures. The metals are preferably chosen from nickel, copper, molybdenum, platinum, palladium and the mixtures of two or more of them in all proportions.

The support of the catalyst can be of any type well known to a person skilled in the art and is advantageously chosen from porous supports, more advantageously from porous refractory supports. Nonlimiting examples of supports comprise alumina, silica, zirconia, magnesia, beryllium oxide, chromium oxide, titanium oxide, thorium oxide, ceramic, carbon, such as carbon black, graphite and activated carbon, and also their combinations. Mention may be made, among the specific and preferred examples of a support which can be used in the process of the present invention, of amorphous aluminosilicates, crystalline aluminosilicates (zeolites) and supports based on silica-titanium oxide.

The hydrogenation reaction can also be carried out for its part according to any method well known to a person skilled in the art on a formulation comprising at least one BTX mixture as defined above.

The hydrogenation reaction is generally carried out at a temperature of between 100° C. and 300° C., preferably between 120° C. and 280° C. and more preferably from 140° C. to 250° C. The pressure employed for this reaction is generally of between 0.1 MPa and 5 MPa, preferably between 0.5 MPa and 4 MPa and more preferably between 1 MPa and 3 MPa.

The hydrogenation reaction is generally carried out in the presence of a catalyst and more particularly of a hydrogenation catalyst well known to a person skilled in the art and advantageously chosen from, by way of nonlimiting examples, heterogeneous catalysts containing metals on a support. Said metal is chosen from the metals of columns 3 to 12 of the Periodic Table of the Elements of the IUPAC, that is to say from the transition metals of said periodic table. In a preferred embodiment, the metal is chosen from the metals of columns 5 to 11, more preferentially of columns 5 to 10, of the Periodic Table of the Elements of the IUPAC.

The metals of these hydrogenation catalysts are generally chosen from iron, cobalt, copper, titanium, molybdenum, manganese, nickel, platinum, palladium, rhodium, iridium and ruthenium, and their mixtures. The metals are preferably chosen from nickel, copper, molybdenum, platinum, palladium and the mixtures of two or more of them in all proportions.

The support of the catalyst can be of any type well known to a person skilled in the art and is advantageously chosen from porous supports, more advantageously from porous refractory supports. Nonlimiting examples of supports comprise alumina, silica, zirconia, magnesia, beryllium oxide, chromium oxide, titanium oxide, thorium oxide, ceramic, carbon, such as carbon black, graphite and activated carbon, and also their combinations. Mention may be made, among the specific and preferred examples of a support which can be used in the process of the present invention, of amorphous aluminosilicates, crystalline aluminosilicates (zeolites) and supports based on silica-titanium oxide.

According to a preferred embodiment, the hydrogenation reaction is carried out on a completely or partially dehydrogenated formulation, for example at least partially dehydrogenated, in one or more hydrogenation/dehydrogenation cycles.

Similarly, the hydrogenation reaction can be partial or complete and preferably the hydrogenation reaction is complete in one or more hydrogenation/dehydrogenation cycles, that is to say that all of the double bonds capable of being hydrogenated present in the LOHC formulation are completely hydrogenated.

According to another aspect, the invention relates to a process for upgrading BTXs. This is because BTXs are products regarded as toxic and ecotoxic and are very difficult to upgrade, indeed even today are not or not significantly upgraded, and simply destroyed, generally by combustion, thus generating, in addition to air pollution, not insignificant emissions of carbon dioxide, which is known to be one of the causes of climate change and global warming.

Thus, the present invention offers a very particularly advantageous possibility of using BTXs, most often generated by the petrochemical industry. The upgrading process of the invention comprises the provision of a mixture referred to as BTX mixture, as defined above, in a system where it is hydrogenated, in all or at least in part, optionally stored, and/or optionally transported, then subjected to a stage of complete or at least partial dehydrogenation, so as to release the hydrogen bonded to the completely or at least partially hydrogenated BTX. The upgrading process of the invention can additionally comprise, and advantageously comprises, several hydrogenation/dehydrogenation cycles, for example from 2 to 200 cycles, preferably from 5 to 100 cycles.

One of the advantages of the process of the present invention is that the BTX thus upgraded is used in a cycle comprising several hydrogenation/dehydrogenation operations, and is not, or only in very small proportions, in contact with the air or with the people who are required to handle it. This is because the storage and/or transportation of hydrogen does not in any way require having access to the BTX itself, whether it is in dehydrogenated or completely or at least partially hydrogenated form. Thus, in the process of the invention, the mixtures referred to as BTX mixtures are upgraded as energy storage products, this energy being hydrogen.

According to yet another aspect, the present invention relates to a hydrogenation/dehydrogenation cycle comprising a partial or complete dehydrogenation reaction of an LOHC formulation as has just been defined and at least one partial or complete hydrogenation reaction of said organic liquid.

In the LOHC application, the formulations for the transportation of hydrogen, the use of which is the subject matter of the present invention, are very particularly well suited because of their stability, which makes possible reuse in a large number of hydrogenation/dehydrogenation cycles for the transportation but also the storage and the handling of hydrogen resulting from the steam cracking of petroleum products, of inevitable hydrogen resulting from chemical reactions, such as the electrolysis of salt, or of hydrogen resulting from the electrolysis of water.

The invention claimed is:

1. A method of storing hydrogen comprising fixing the hydrogen with a formulation which is liquid at ambient temperature, the formulation comprising a mixture of benzene, toluene and xylene for the fixing and the release of the hydrogen in at least one hydrogenation/dehydrogenation cycle of said formulation.

2. The method as claimed in claim 1, in which the mixture of benzene, toluene and xylene is a BTX mixture resulting from the extraction of aromatic compounds from a crude oil or from the upgrading of biomass.

3. The method as claimed in claim 1, in which the mixture of benzene, toluene and xylene can additionally comprise compounds comprising more than 8 atoms, in an amount which is not greater than 1000 ppm by weight, with respect to the total weight of the formulation.

4. The method as claimed in claim 1, in which the ratio of the mixture of benzene, toluene and xylene can vary in all proportions ranging from 0% to 100%, limits excluded, by weight of each constituent, with respect to the total weight of the mixture.

5. The method as claimed in preceding claim 1, in which the mixture of benzene, toluene and xylene which can be used in the context of the present invention contains a benzene content of greater than 1%, with respect to the total weight of the BTX mixture.

6. The method as claimed in claim 1, in which the formulation additionally comprises one or more other Liquid Organic Hydrogen Carrier(s) (LOHC(s)).

7. The method as claimed in claim 1, in which the formulation additionally comprises one or more other Liquid Organic Hydrogen Carrier(s) (LOHC(s)) selected from the group consisting of benzyltoluene (BT), dibenzyltoluene (DBT) and their mixtures in all proportions.

8. The method as claimed in claim 1, in which the formulation exhibits a boiling point of greater than 80° C., at atmospheric pressure, and a melting point of less than 40° C.

9. The method as claimed in claim 1, in which the formulation exhibits a kinematic viscosity at 20° C. measured according to the standard DIN 51562 of between 0.1 $mm^2 \cdot s^{-1}$ and 500 $mm^2 \cdot s^{-1}$.

* * * * *